US009536249B2

(12) United States Patent
Ramakrishnan et al.

(10) Patent No.: US 9,536,249 B2
(45) Date of Patent: Jan. 3, 2017

(54) MEASURING INLINE AD PERFORMANCE FOR THIRD-PARTY AD SERVING

(75) Inventors: Eyal Arasu Ramakrishnan, Santa Clara, CA (US); Rampradeep Dodda, Santa Clara, CA (US); Prabhakar Goyal, Sunnyvale, CA (US)

(73) Assignee: Excalibur IP, LLC, Sunnyvale, CA (US)

( * ) Notice: Subject to any disclaimer, the term of this patent is extended or adjusted under 35 U.S.C. 154(b) by 507 days.

(21) Appl. No.: 12/894,000

(22) Filed: Sep. 29, 2010

(65) Prior Publication Data

US 2012/0078707 A1    Mar. 29, 2012

(51) Int. Cl.
  *G06Q 30/00* (2012.01)
  *G06Q 30/02* (2012.01)
  *H04L 29/06* (2006.01)

(52) U.S. Cl.
  CPC ...... *G06Q 30/0242* (2013.01); *G06Q 30/0244* (2013.01); *G06Q 30/0277* (2013.01); *H04L 29/06523* (2013.01); *G06Q 30/0241* (2013.01)

(58) Field of Classification Search
  CPC   G06Q 30/02; G06Q 30/0241; G06Q 30/0242; G06Q 30/0244; G06Q 30/0254; G06Q 30/0263; G06Q 30/0277; H04L 29/06522
  USPC ............ 705/14.4, 14.41, 14.43, 14.52, 14.6, 705/14.73; 709/224
  See application file for complete search history.

(56) References Cited

U.S. PATENT DOCUMENTS

| 6,490,602 | B1 * | 12/2002 | Kraemer ....................... 715/236 |
| 6,725,272 | B1 * | 4/2004 | Susai et al. ................... 709/229 |
| 7,058,706 | B1 * | 6/2006 | Iyer et al. ..................... 709/223 |
| 7,359,952 | B2 * | 4/2008 | Doemling et al. ............ 709/217 |
| 7,454,547 | B1 * | 11/2008 | Nallagatla et al. ........... 710/260 |
| 7,636,887 | B1 * | 12/2009 | Kinnucan, Jr. ............... 715/705 |
| 7,949,563 | B2 * | 5/2011 | Collins ..................... 705/14.43 |
| 8,239,522 | B1 * | 8/2012 | Luby et al. ................... 709/224 |
| 8,307,101 | B1 * | 11/2012 | Mui et al. ..................... 709/229 |
| 8,392,562 | B2 * | 3/2013 | Rajan et al. .................. 709/225 |
| 8,510,431 | B2 * | 8/2013 | Britton et al. ................ 709/224 |

(Continued)

OTHER PUBLICATIONS

Merriam-Webster's Collegiate Dictionary, Tenth Edition (Merriam-Webster, Incorporated 1998) at p. 84).*

*Primary Examiner* — Bennett Sigmond
(74) *Attorney, Agent, or Firm* — Brinks Gilson & Lione

(57) ABSTRACT

A method, apparatus, and computer program product for measuring inline internet ad performance for third-party ad serving. The method comprises receiving an original third-party internet ad and recoding the original third-party internet ad for producing a recoded third-party internet ad where the recoded third-party internet ad comprises ad instrumentation code. In real-time, as the internet ad is composited and rendered, the instrumentation code measures the response latency of the server or servers in the third-party network using the ad instrumentation code. In some cases, the original third-party internet ad comprises ad code using a markup language such as HTML language, and/or JavaScript language (e.g. in ad code segments). The recoding comprises recoding an ad code segment of the ad by transforming the ad code segment into a JavaScript literal, which in exemplary embodiments includes emitting a specialized document.write( ) call. Response latency measurements are collected and included in a latency table.

31 Claims, 8 Drawing Sheets

(56) References Cited

U.S. PATENT DOCUMENTS

| | | | |
|---|---|---|---|
| 2002/0023048 A1* | 2/2002 | Buhannic et al. | 705/37 |
| 2003/0099202 A1* | 5/2003 | Lear et al. | 370/238 |
| 2003/0233445 A1* | 12/2003 | Levy et al. | 709/224 |
| 2006/0136372 A1* | 6/2006 | Schunemann | 707/2 |
| 2008/0010112 A1* | 1/2008 | Kniaz et al. | 705/14 |
| 2008/0016113 A1* | 1/2008 | Theobald et al. | 707/104.1 |
| 2008/0040225 A1* | 2/2008 | Roker | 705/14 |
| 2008/0104224 A1* | 5/2008 | Litofsky et al. | 709/224 |
| 2008/0165684 A1* | 7/2008 | Sridharan et al. | 370/231 |
| 2009/0040927 A1* | 2/2009 | Tsun | 370/232 |
| 2009/0100154 A1* | 4/2009 | Stevenson et al. | 709/220 |
| 2009/0125719 A1* | 5/2009 | Cochran et al. | 713/171 |
| 2009/0292608 A1* | 11/2009 | Polachek | 705/14.44 |
| 2009/0307081 A1* | 12/2009 | Rabbitt et al. | 705/14.42 |
| 2010/0125852 A1* | 5/2010 | Grant et al. | 719/311 |
| 2010/0131352 A1* | 5/2010 | Malhotra | G06Q 30/02 705/14.42 |
| 2010/0211467 A1* | 8/2010 | Ramanathan | 705/14.72 |
| 2010/0324999 A1* | 12/2010 | Conway et al. | 705/14.73 |

\* cited by examiner

MEASURING INLINE AD PERFORMANCE FOR THIRD-PARTY AD SERVING

FIELD OF THE INVENTION

The present invention is directed towards internet advertising, and more particularly to measuring inline ad performance for third-party internet advertising ad serving.

BACKGROUND OF THE INVENTION

The exploding popularity and sophistication of the internet has brought to bear easy access for anyone or any entity to publish, consume and aggregate content. Along with an explosion of content, the rate of appearance of advertisements that accompany content (and serve to monetize the content) is growing at a similar pace. Internet advertising supports a large and sophisticated ecosystem of participants including publishers, content providers, ad networks, ad agencies, ad aggregators, and ad arbitragers.

Some of the participants are more technologically savvy than others, and understand the inner workings of an ad network. In contrast, some of the participants have more marketing savvy than others, but do not necessarily understand the inner workings of ad placement. Highly effective internet advertising demands high performance from the network as well as high performance (e.g. high performance in the form of clicks or conversions) from the population to which the advertisement is targeted. However, in some situations, higher-performing advertisements (e.g. using video, animations, pop-ups, dynamically assembled targeted ad content, etc) might demand ad network resources to such an extent that the user experience suffers.

For example, an advertisement placement that is dynamically assembled using multiple network locations for content might require a long time to assemble and, in the meantime, the user is waiting for the destination page to be fully rendered on his/her terminal. The problem is exacerbated when considering aspects of the aforementioned ecosystem, and in particular that advertisement placement involves not only a content publisher (e.g. Disney.com) and an ad network (e.g. yahoo.com), but also may include any number of third parties (e.g. ad agencies, ad aggregators, ad arbitragers, etc), any of which third parties may not be so technologically sophisticated as pertains to the inner workings of internet advertising such that the third-party produces a high-performing ad.

There exist many techniques for reducing the dynamic assembly time, however it remains to be known which advertisement placements require a long time to assemble. Thus, for this reason and other reasons, there exists a need for measuring inline ad performance for third-party ad serving.

SUMMARY OF THE INVENTION

A method, apparatus, and computer program product for measuring inline internet ad performance for third-party ad serving. The method comprises receiving an original third-party internet ad and recoding the original third-party Internet ad for producing a recoded third-party internet ad where the recoded third-party internet ad comprises ad instrumentation code. In real-time, as the internet ad is composited and rendered, the instrumentation code measures the response latency of the server or servers in the third-party network using the ad instrumentation code. In some cases, the original third-party internet ad comprises ad code using a markup language such as HTML language, and/or JavaScript language (e.g. in ad code segments). The recoding comprises recoding an ad code segment of the ad by transforming the ad code segment into a JavaScript literal, which in exemplary embodiments includes emitting a specialized document.write( ) call. Response latency measurements are collected and included in a latency table. During response latency measurements, and in cases of a response latency longer than some specified time value, the recoded ad code segment displays a backfill ad, rather than continue waiting for the intended ad.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
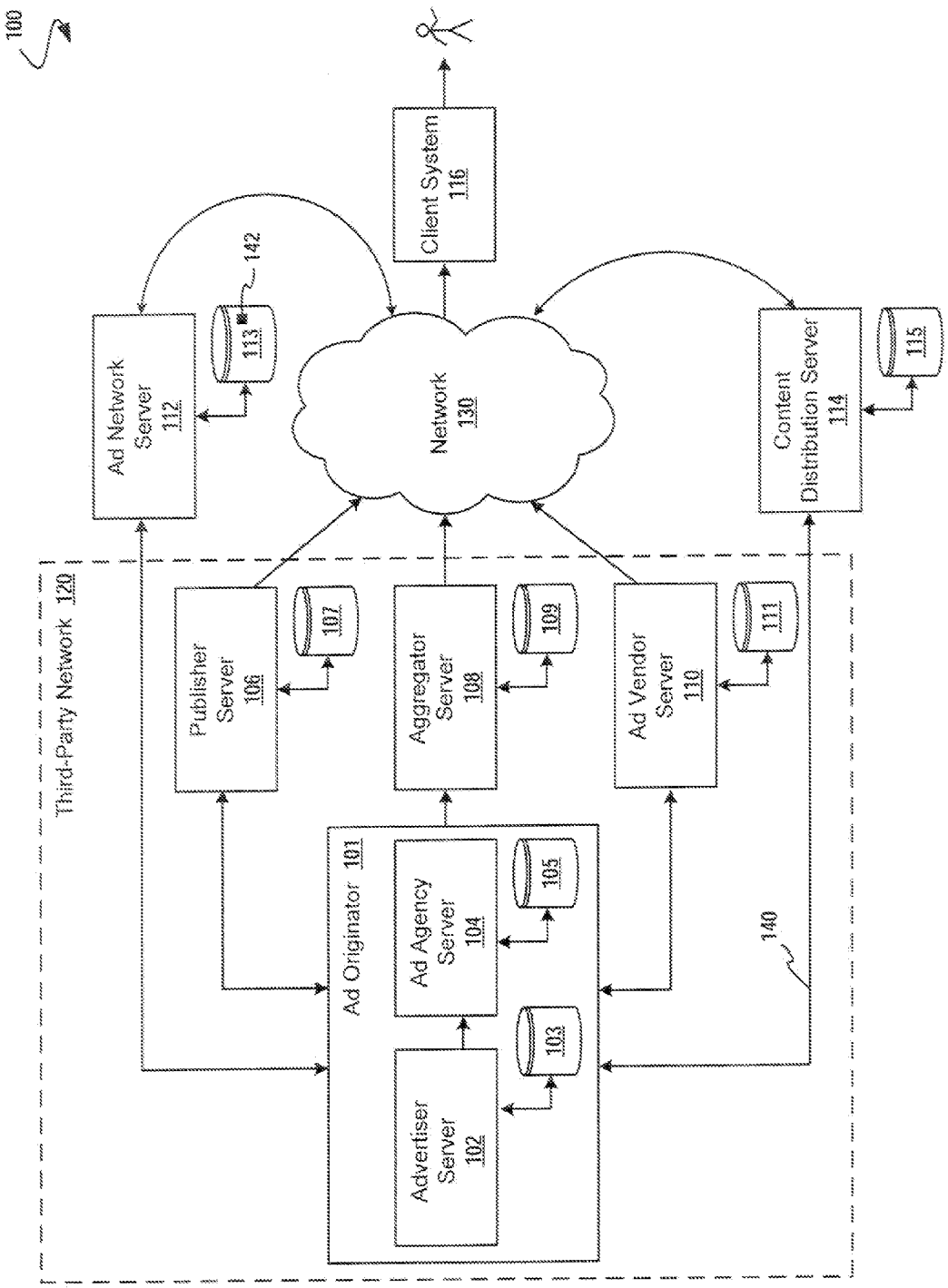
FIG. 1 depicts an internet ad ecosystem for serving content and inline advertisements including an ad network server, a content distribution server, and a third-party network of servers, according to an exemplary embodiment.

In the following description, numerous details are set forth for purpose of explanation. However, one of ordinary skill in the art will realize that the invention may be practiced without the use of these specific details. In other instances, well-known structures and devices are shown in block diagram form in order to not obscure the description of the invention with unnecessary detail.

DEFINITIONS

Some terms are defined below in alphabetical order for easy reference. These terms are not rigidly restricted to these definitions. A term may be further defined by the term's use in other sections of this description.

"Ad" (e.g. ad, item and/or message) means a paid announcement, as of goods or services for sale, preferably on a network, such as the internet. An ad may also be referred to as an ad, an item and/or a message.

"Ad call" means a message, sent by a computer to an ad server for requesting an ad to be displayed.

"Ad click-through rate" (e.g. click-through rate) means a measurement of ad clicks per a period of time.

"Ad code" means the HTML or other markup language description that describes an advertisement or message in such a manner as can be parsed by a browser. Ad code may include references to other ad code. Ad code may mean any subset, or portion or segment of ad code that describes an advertisement or message in such a manner as can be parsed by a browser.

"Ad server" is a server that is configured for serving one or more ads to user devices. An ad server is preferably controlled by a publisher of a website and/or an advertiser of online ads. A server is defined below.

"Advertiser" (e.g. messenger and/or messaging customer, etc.) means an entity that is in the business of marketing a product and/or a service to users. An advertiser may include without limitation a seller and/or a third-party agent for the seller. An advertiser may also be referred to as a messenger and/or a messaging customer. Advertising may also be referred to as messaging.

"Advertising" means marketing a product and/or service to one or more potential consumers by using an ad. One example of advertising is publishing a sponsored search ad on a website.

"Application server" is a server that is configured for running one or more devices loaded on the application server. For example, an application server may run a device configured for deducing shadow profiles.

"Click" (e.g. ad click) means a selection of an ad impression by using a selection device, such as, for example, a computer mouse or a touch-sensitive display.

"Client" means the client part of a client-server architecture. A client is typically a user device and/or an application that runs on a user device. A client typically relies on a server to perform some operations. For example, an email client is an application that enables a user to send and receive email via an email server. In this example, the computer running such an email client may also be referred to as a client.

"Conversion" (e.g. ad conversion) means a purchase of a product/service that happens as a result of a user responding to an ad and/or a coupon.

"Coupon" (e.g. coupon ad) means a portion of a certificate, ticket, label, ad or the like set off from the main body by dotted lines or the like to emphasize its separability, entitling the holder to something, such as a gift or discount, or for use as an order blank or a contest entry form, etc. A coupon is designed in a convenient format for a user to "take" the coupon to a seller to receive an advertised benefit.

"Database" (e.g. database system, etc.) means a collection of data organized in such a way that a computer program may quickly select desired pieces of the data. A database is an electronic filing system. In some instances, the term "database" is used as shorthand for "database management system". A database may be implemented as any type of data storage structure capable of providing for the retrieval and storage of a variety of data types. For instance, a database may comprise one or more accessible memory structures such as a CD-ROM, tape, digital storage library, flash drive, floppy disk, optical disk, magnetic-optical disk, erasable programmable read-only memory (EPROM), random access memory (RAM), magnetic or optical cards, etc.

"Device" means hardware, software or a combination thereof. A device may sometimes be referred to as an apparatus. Examples of a device include without limitation a software application such as Microsoft Word™, a laptop computer, a database, a server, a display, a computer mouse and/or a hard disk.

"Impression" (e.g. ad impression) means a delivery of an ad to a user device for viewing by a user.

"Item" means an ad, which is defined above.

"Marketplace" means a world of commercial activity where products and/or services are browsed, bought and/or sold, etc. A marketplace may be located over a network, such as the Internet. A marketplace may also be located in a physical environment, such as a shopping mall.

"Message" means an ad, which is defined above.

"Messaging" means advertising, which is defined above.

"Messenger" means an advertiser, which is defined above.

"Network" means a connection, between any two or more computers, that permits the transmission of data. A network may be any combination of networks, including without limitation the internet, a local area network, a wide area network, a wireless network, and/or a cellular network.

"Publisher" means an entity that publishes, on a network, a web page having content and/or ads, etc.

"Server" means a software application that provides services to other computer programs (and their users), in the same computer or another computer. A server may also refer to the physical computer that has been set aside to run a specific server application. For example, when the software Apache HTTP Server is used as the web server for a company's website, the computer running Apache may also be called the web server. Server applications may be divided among server computers over an extreme range, depending upon the workload.

"Social network" means a networked software application having user accounts (e.g. nodes) that are coupled by using one or more interdependencies such as, for example, friendship, kinship, common interest, financial exchange, dislike, sexual relationship, beliefs, knowledge and/or prestige. Examples of a social network include without limitation Facebook™, Twitter™, Myspace™, Delicious™, Digg™, and/or Stumble Upon™.

"Software" means a computer program that is written in a programming language that may be used by one of ordinary skill in the art. The programming language chosen should be compatible with the computer on which the software application is to be executed and, in particular, with the operating system of that computer. Examples of suitable programming languages include without limitation Object Pascal, C, C++ and/or Java. Further, the functions of some embodiments, when described as a series of steps for a method, could be implemented as a series of software instructions for being operated by a processor, such that the embodiments could be implemented as software, hardware, or a combination thereof. Computer readable media are discussed in more detail in a separate section below.

"System" means a device or multiple coupled devices. A device is defined above.

"User" (e.g. consumer, etc.) means an operator of a user device. A user is typically a person who seeks to acquire a product and/or service. For example, a user may be a woman who is browsing Yahoo!™ Shopping for a new cell phone to replace her current cell phone. The term "user" may refer to a user device, depending on the context.

"User device" (e.g. computer, user computer, client and/or server, etc.) means a single computer or a network of interacting computers. A user device is a computer that a user may use to communicate with other devices over a network, such as the internet. A user device is a combination of a hardware system, a software operating system, and perhaps one or more software application programs. Examples of a user device include without limitation a laptop computer, a palmtop computer, a smart phone, a cell phone, a mobile phone, an IBM-type personal computer (PC) having an operating system such as Microsoft Windows™, an Apple™ computer having an operating system such as MAC-OS, hardware having a JAVA-OS operating system, and/or a Sun Microsystems Workstation having a UNIX operating system.

"Web browser" means a software program that may display text, graphics, or both, from web pages on websites. Examples of a web browser include without limitation Mozilla Firefox™ and Microsoft Internet Explorer™.

"Web page" means documents written in a mark-up language including without limitation HTML (hypertext mark-up language), VRML (virtual reality modeling language), dynamic HTML, XML (extensible mark-up language), and/or other related computer languages. A web page may also refer to a collection of such documents reachable through one specific internet address and/or through one specific website. A web page may also refer to any document obtainable through a particular URL (Uniform Resource Locator).

"Web portal" (e.g. public portal) means a website or service that offers a broad array of resources and services such as, for example, email, forums, search engines, and online shopping malls. The first web portals were online services, such as AOL, that provided access to the web. However, now, most of the traditional search engines (e.g. Yahoo!™) have transformed themselves into web portals to attract and keep a larger audience.

"Web server" is a server configured for serving at least one web page to a web browser. An example of a web server is a Yahoo!™ web server. A server is defined above.

"Website" means one or more web pages. A website preferably includes a plurality of web pages virtually connected to form a coherent group.

INTRODUCTION

The exploding popularity and sophistication of the internet has brought to bear easy access for anyone or any entity to publish, consume and aggregate content. Along with an explosion of content, the rate of appearance of advertisements that accompany content (and serve to monetize the content) is growing at a similar pace. Internet advertising supports a large and sophisticated ecosystem of participants including publishers, content providers, ad networks, ad agencies, ad aggregators, and ad arbitragers.

In some situations, higher-performing advertisements (e.g. using video, animations, pop-ups, dynamically assembled targeted ad content, etc) might demand ad network resources to such an extent that the user experience suffers. There exist many techniques for reducing the dynamic assembly-time, however it remains to be known which advertisement placements require a long time to assemble. Thus, for this reason and other reasons, there exists a need for measuring inline ad performance for third-party ad serving.

Premiere content providers (e.g. Disney.com) and premiere ad network operators (e.g. Yahoo) are very conscientious about keeping the user experience at acceptable levels, while optimizing the monetization aspects of internet advertising. This optimization becomes more complex when both content and an ad are delivered together, and still more complex when inline ads are provided by third parties who many not possess a high degree of technological sophistication as regards the inner workings of internet advertising. Techniques and systems are needed for measuring inline ad performance for third-party ad serving such that poorly-performing ads from third-party ad serving can be identified and then subjected to corrective action. One such technique as is disclosed herein includes methods and systems to instrument ads such that actual ad performance can be measured. Also disclosed herein are techniques to collect such performance data in real-time, and to aggregate and report in a manner that supports administration of corrective actions.

FIG. 1 depicts an internet ad ecosystem 100 for serving content and inline advertisements including an ad network server, a content distribution server, and a third-party network of servers. As shown, the internet ad ecosystem includes a network 130 (e.g. the internet and any subnets comprising any part of the internet) and a client system 116.

In operation, the internet ad ecosystem 100 as shown coordinates activities of multiple participants for serving ads including content and inline ads and, more particularly, the internet ad ecosystem serves for measuring inline ad performance where servers within a third-party network 120 are employed.

In exemplary operation, an ad originator 101 (e.g. an advertiser or an agency, or their servers) can place an ad within some other content. For example, an ad originator can establish a contractual relationship with a publisher for placement of an internet ad. When the publisher's content is requested by a user, the publisher's content and the inline advertisement are composited for display on the user's display device (e.g. on client system 116). In some cases, the contractual arrangement may include an ad network operator (not shown). In such a case the publisher's content may be composited using a content distribution server 114 (and a content distribution server repository 115) in conjunction with an ad network server 112 (and an ad network server repository 113).

In a slightly more sophisticated example, an ad agency may operate on behalf of an advertiser, and might establish contractual relationships with a publisher, and/or an aggregator, and/or an ad vendor. In actual operation, an ad agency server 104 (using an agency server repository 105) may place an ad on behalf of an advertiser by embedding an ad or a portion of an ad, or embedding a link to an ad or a link to a portion of an ad, within some publisher's content (e.g. within content stored in a publisher server repository 107) accessible by a publisher server 106. Similarly, an ad agency server 104 (using an agency server repository 105) may place an ad on behalf of an aggregator by embedding an ad or a portion of an ad, or embedding a link to an ad or a link to a portion of an ad, within some aggregator's content (e.g. within content stored in an aggregator server repository 109) accessible by an aggregator server 108. In yet another example, an ad agency server 104 (using an agency server repository 105) may place an ad on behalf of an ad vendor by embedding an ad or a portion of an ad, or embedding a link to an ad or a link to a portion of an ad, within some ad vendor's content (e.g. within content stored in an ad vendor server repository 111) accessible by an ad vendor server 110.

Of course, it is possible that an advertiser (with or without an agency) participates in the internet ad ecosystem 100 by operating the advertiser's own servers (see advertiser server 102) and, possibly also using an advertiser server repository 103, may place an ad on the advertiser's own behalf by embedding an ad or portion of an ad, or embedding a link to an ad or a link to a portion of an ad, within some publisher's content (e.g. content stored in a publisher server repository 107, and/or in an aggregator server repository 109, and/or in an ad vendor server repository 111, and/or in a content distribution server repository 115).

Quantitative Measurement of a User Experience

Quantitative aspects of a user experience (e.g. user perception) include loading time of a user's requested page. For example a user might navigate using a browser to http://disney.com and expect to see content related to Disney. In general a web page might be composited using several regions. For example, a web page might contain a plurality of components to be placed in corresponding regions on the page. For example, a front page of a destination site (e.g. Disney.com) can comprise a region for display of branding information (e.g. a component including the Disney logo), a region for a banner ad component, an area for a video display component, an area for a coupon (e.g. with clickable components), and any number of areas for user interaction (e.g. any number of components comprising links, buttons, screen devices, etc).

The loading time of a destination page includes the aggregate time (e.g. overall response latency) as incurred by all of the components that participate in delivery of the content and advertisements after adjusting for any time-wise parallel loading operations. It is possible that a destination page contains multiple advertisements (e.g. ad 1 through ad n), each occupying a particular region or position on the page. Any ad or portion of an ad might be delivered from within an advertiser network, or an ad or a portion of an ad might involve a network call to a server within a third-party network in order to deliver the ad in its entirety.

Using the techniques described herein, individual ads may be instrumented and measured in real-time, and the performance of an ad may be quantified. Performance of a particular ad often refers to the end-to-end time taken from the start of the ad request (e.g. from an ad call) until the requested ad (including any components) is fully loaded and rendered by the browser onto the user's client system. Operations that incur measurable time include:
1. Any ad network server 112 calls to respond to an ad call (i.e. to fetch the ad to be placed);
2. Any calls made to a content distribution server 114 within a content distribution network (CDN) from the client system browser to fetch any components of the ad (e.g. any assets, screen devices, JavaScript code, flash libraries, etc);
3. Any calls made to any server or servers within a third-party network 120 in order to fetch any ads, including any redirects that may result in subsequent ad calls to further servers (possibly recursively); and
4. The time to render the ad onto the user's client system display.

Given these operations incurred for rendering an ad, the ad performance is perceived by the user to be only as fast as the end-to-end performance. Thus, the techniques disclosed herein serve to monitor such operations in order that poorly performing ads may be identified such that corrective action may be taken.

In some cases the instrumentation and measurements taken as described in the previous paragraphs can be extended to cover any collection of ads, even ads within ads, or even screen devices within ads within ads, etc.

Figure 2:
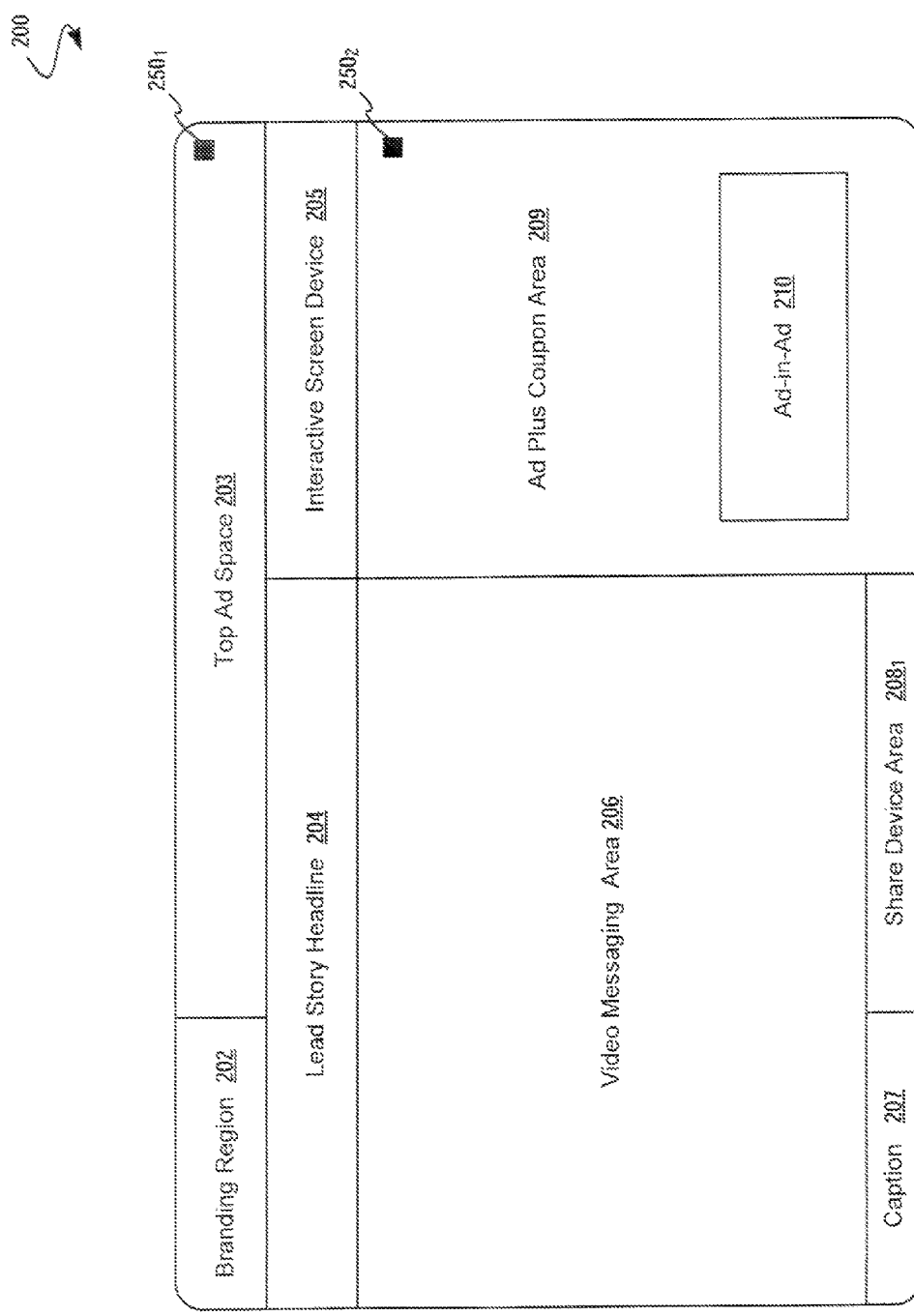
FIG. 2 depicts a destination front page showing a plurality of regions for constituent components of a destination front page, according to an exemplary embodiment.

FIG. 2 depicts a destination front page showing a plurality of regions for constituent components of a destination front page. As shown, the destination front page 200 comprises a branding region 202, possibly for display of a branding logo or message, a top ad space 203, possibly for display of a banner ad, a lead story headline space 204, and an interactive screen device 205. Also depicted is a video messaging area 206, a caption area 207, a share device area 208, and an ad plus coupon area 209. The ad plus coupon area 209 includes an ad-in-ad area 210. Of course any ad may contain an ad-in-ad area and, recursively, an ad-in-ad area may contain a further ad-in-ad area. Moreover, a particular ad may be sponsored or placed by an agent or aggregator, and such an ad might involve one or more sub-advertisers. For example, an ad placed by an aggregator (e.g. the chamber of commerce of Anytown, USA) might promote tourism by offering suggestions of locations for fine dining. The aggregator might then follow some promotion rules and place (within the aggregator's tourism ad) further ads in the form of an ad-in-ad area. In such an example, the ad-in-ad materials might be provided by the advertiser (e.g. on an advertiser server repository 103) or by the advertiser's agency (e.g. on the agency server repository 105), or by any other party in the internet ad ecosystem 100 for that matter.

Thus it becomes apparent that the display of a destination page might involve multiple network calls in succession in order to retrieve all components for composition and display on the user's client system display device. Furthermore any ad (e.g. a top ad space 203, and/or an ad-in-ad area 210) might contain one or more instances of ad instrumentation code 250. As shown, the top ad space 203 contains an instance of ad instrumentation code $250_1$, and the ad-in-ad area 210 also contains an instance of ad instrumentation code $250_2$.

Figure 3:
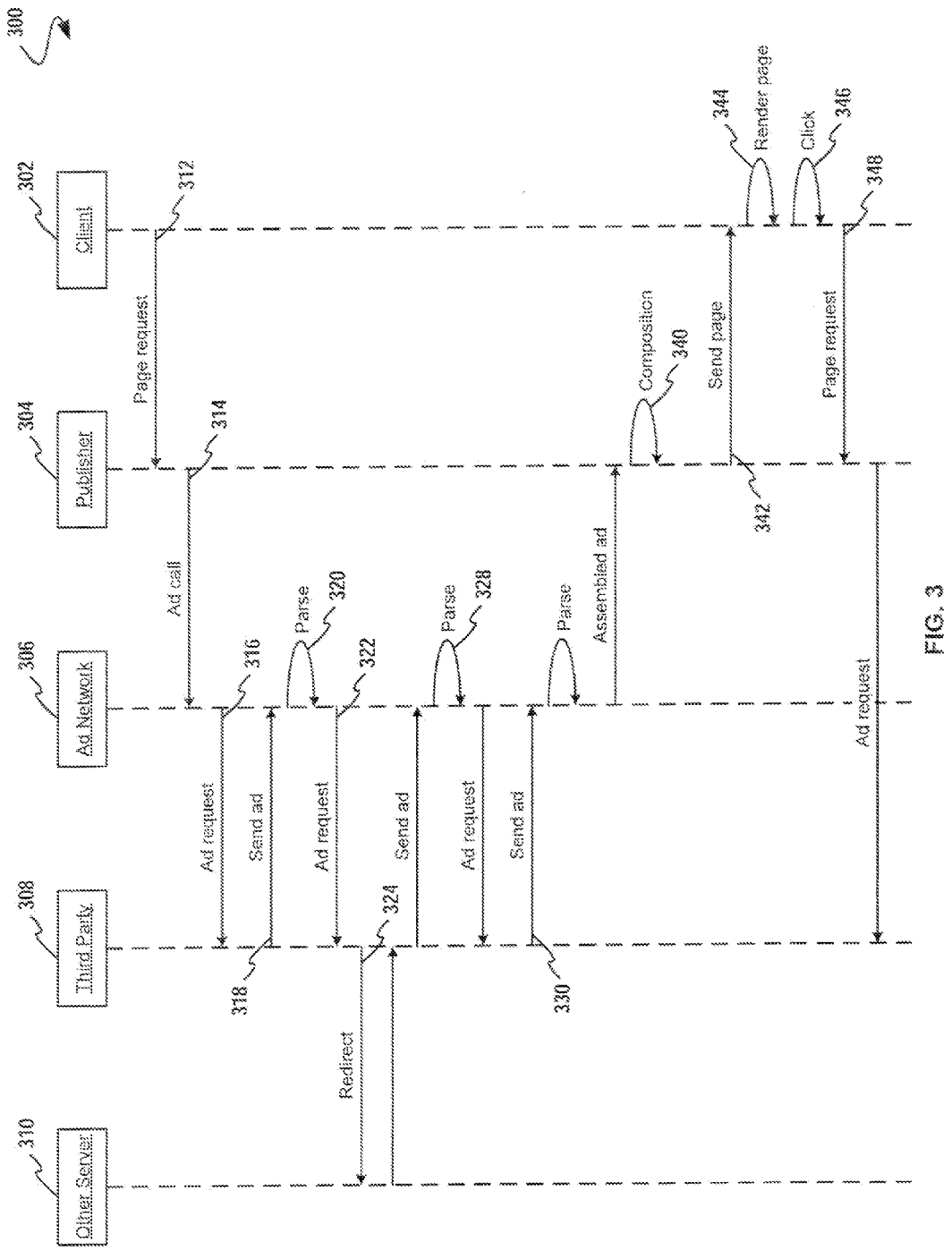
FIG. 3 depicts a communication protocol for rendering a destination page including responding to an ad call involving retrieval of components from a third-party network, according to an exemplary embodiment.

FIG. 3 depicts a communication protocol 300 for rendering a destination page including responding to an ad call involving retrieval of components from a third-party network. As shown, a client 302 (e.g. client system 116) sends a page request, e.g. clicks on a link to a destination page, (see message 312) to a publisher 304 (e.g. to a publisher server 106). As the publisher 304 begins to compose the requested page, the compositing operation (not shown) encounters an advertisement, which in turn results in an ad call (see message 314) sent to an ad network 306. In exemplary embodiments, the ad network 306 may include an ad network server 112, upon which ad network server 112 the ad call is resolved to an ad request (see message 316). The ad request may involve a further network request to a third party 308, or more specifically the ad request may involve a further network request to a server within a third-party network 120, and such a server (e.g. advertiser server 102, ad agency server 104, publisher server 106, aggregator server 108, or ad vendor server 110) can respond by sending the ad to the requestor (see message 318). The requestor, in this exemplary case, the ad network 306, can parse the code comprising the ad (see operation 320) which may then cause the ad network 306 to send a further ad request (see message 322), which in turn might be redirected (see message 324) to still another other server 310—and possibly recursively where the operation to parse the code comprising the ad makes a call to another server that in turn performs an operation to parse the code comprising the ad. Upon receipt of the requested (i.e. after the aforementioned redirection), the ad network 306 continues to parse, in this case parsing (see operation 328) the material just returned from the other server (see message 330). At some point the components of the ad that became the subject of the ad call (see message 314) are all available, and thus the assembled ad can be sent to the publisher for composition (see operation 340). Once composited, the web page requested by the client 302 is sent to the client (see message 342) for rendering (see operation 344) on a client system display Using any of the interactive screen devices returned in the displayed web page, the user may click (see operation 346) on the screen device and a page request (see message 348) may begin a new sequence.

Of course, any one or more of the aforementioned messages and/or operations may contribute to the response latency and thus to the performance of the page rendering, which may result in a user perception of subjectively unacceptable page performance. Accordingly, the techniques herein can be applied to any one or more of the aforementioned messages and/or operations that contribute to measurable and thus subsequently acceptable performance. A wide range of messages and operations may be involved in measuring inline ad performance, especially for ad serving involving third-party networks.

It should be emphasized that the specific computers (e.g. 302, 304, 306, 308, and/or 310) may serve to perform at least some portion of the described messaging and operations. In particular, any portion of receiving a third-party internet ad, and/or recoding the third-party internet ad, and/or measuring inline ad performance may be performed (in whole or in part) by any one or more computers.

Characteristics Influencing Instrumentation and Measurement

To enable reliable and user-acceptable performance of an ad network supporting third-party ads, there is a need for techniques and systems for instrumenting ads, for collecting performance metrics, and for determining corrective action to take for low-performing third-party ads. Exemplary systems include one or more of the following characteristics where:

- Total third-party network time (e.g. ad server time, third-party ad selection/redirect time, etc) should meet a defined service level, Such a level could be defined in a service level agreement (SLA) for ad delivery.
- Total third-party network time may include content distribution time when a third-party network requests such content. For example, see path 140 of FIG. 1.
- Instrumentation collects a measurement of various ad latencies (e.g. granularity of hops, latency per hop, etc).
- Post-processing serves to catch offenders (i.e. third parties operating on poorly-performing networks or serving poorly-performing ads).
- Offenders are identified in near-real-time, and alerts are issued based on frequency thresholds and/or response latency thresholds.
- Instrumentation and/or reporting should have a way to measure the impact of third-party ads on overall destination page (e.g. front page) rendering, and overall round-trip performance as observable by the user on the user's client device.
- Exemplary systems provide a process whereby any creative is screened editorially for quality, content, rotation and presence of malware.
- Exemplary systems provide a process whereby ads served via third-party networks are re-screened periodically to guard against change in creative content. Such a process may use a digital signature for detecting changes in creative content.
- Turnaround time for an ad to be flagged for corrective action can be set based on the type of ad and exposure levels.
- Exemplary systems support use of a backfill ad 142 in case of long latency or otherwise missed SLA (e.g. from a third-party network call time out).
- Exemplary systems support use of a backfill ad 142 in case of long latency or otherwise missed SLA (e.g. from a content distribution network call time out).
- Exemplary systems support flagged (i.e. negative indication) creatives to be subject to corrective action (e.g. to be taken down) within, for example, one minute.
- Client side protections are enforced.
- The system is scalable for:
    - All ads (ad types)
    - All browsers
    - Popular front page accesses (i.e. billions of impressions per day)
    - Rapid, real-time data collection and reporting
- Low or no impact to ad rendering.
- Low or no impact to user experience.

Specific Metrics

The system as herein described serves to collect both quantitative and qualitative data related to the ad and real-time actual performance. For example:

1. SLA Performance Metrics—collection of quantitative performance data regarding each third-party ad call (i.e. hop) and hop latencies.
2. User Feedback Metrics—collection of qualitative performance data from user (page loading, page rendering, etc)
3. Browser, Ad and Campaign Metrics—collection of both quantitative and qualitative browser, ad and campaign data metrics.

Statistical Metric Collection Techniques

Some instrumentation setups include installed clients in the form of a simulated browser across a variety of geographical locations. In operation, a client runs through a list of selected URLs to capture detailed waterfall latency data of all external requests. In some cases, these metric-capturing techniques do not reflect real-world, ad user experienced latencies that may factor in a number of other factors such as CPU load, bandwidth etc. Moreover, statistically accurate reporting may be adversely affected as a result of the makeup of the selected URLs.

Plug-In Approaches

Some instrumentation setups include browser plug-ins. Such approaches are based on leveraging browser add-ins/plug-ins (for example, the "Y! Toolbar", the "YSlow" plug-in etc), to instrument latencies. In some cases, the metrics captured using this technique cannot be applied to a controlled set of users, instead relying on an indeterminate set of an existing base of users who have downloaded and enabled the plug-ins. It is also possible (even likely) that a large number of users who have downloaded and enabled such plug-ins are early tech adopters and may fit into a narrow demographic and/or geographic location that is not sufficiently representative of the desired population of users.

Native Iframe Approaches

Some instrumentation setups include techniques to instrument iframes-based adtags that are modified such that the ad iframe captures measurements as the ads are rendered on property pages in order to capture overall ad load round-trip response latency. In some cases, the metrics captured using this technique can only measure latency of ads in iframes. This technique collects latency data that is granular insofar as the overall round-trip latency time.

Additionally, and in some cases more generalized techniques are provided for real-time data instrumentation, collection and aggregation solutions.

Exemplary Measurable Paths Approach

For purposes of this path approach description, the discussion just below omits the offline operation pertaining to how an ad is booked and trafficked for serving. The operations pertaining to booking the advertisement and operations pertaining to associating (e.g. wrapping) the ad with ad instrumentation code 250 are discussed in a subsequent section.

A simplified exemplary scenario is as follows:

1. A user visits a destination page for some internet property (e.g. mail.yahoo.com).
2. The property server (e.g. the mail.yahoo.com mail server) issues a server side call to an ad server (e.g. a guaranteed delivery server) to fetch ads for the page. Note that there could be multiple fetches for multiple ads corresponding to several different positions on a single page.
3. The user's browser parses the page and fetches page assets. More specifically, the browser receives the page with one or more ad sections (each such ad section possibly including references to assets such as images, video, flash etc). Where an ad section begins, 'Ad Instrumentation' would start (details of this are explained below). The browser continues to queue and fetch all the referenced assets. As has been earlier described, there could be ad-in-ad situations precipitating server calls to third-party vendors like DoubleClick, Atlas, PointRoll, Tumri, Teracent etc. The third-party calls may be chained and could further refer to additional assets via URLs referencing still further third-party vendors or other servers.
4. The ad instrumentation execution concludes at the end of the ad instrumentation code 250.
5. In the example of this embodiment, once references are resolved, the browser starts to display the ad components. Of course various browsers may observe various rules for rendering, and in some cases a browser may display various forms of ads (e.g. text-only ads, text in box only ads, low-bandwidth ads, backfill ads, etc).
6. During or after the execution of ad instrumentation code 250, any portions of measured performance data that are collected are passed to a server for collection, aggregation and possibly report generation. Discussed below is a module for collection, aggregation and report generation (e.g. a beacon processing module). A beacon processing module can serve for collection of real-time events, as well as subsequent aggregation and grouping of the data set by ad identifier and campaign information. Once grouped (or earlier, in some cases), this data is passed to the following components:

A Policy Manager—for subsequent policy enforcement on the performance data, and;

A Data Gathering and Statistics Module—for operations and management purposes.

Various embodiments of a system for measuring inline ad performance for third-party ad serving are discussed below.

Overview of Networked Systems for Online Advertising

Figure 4:
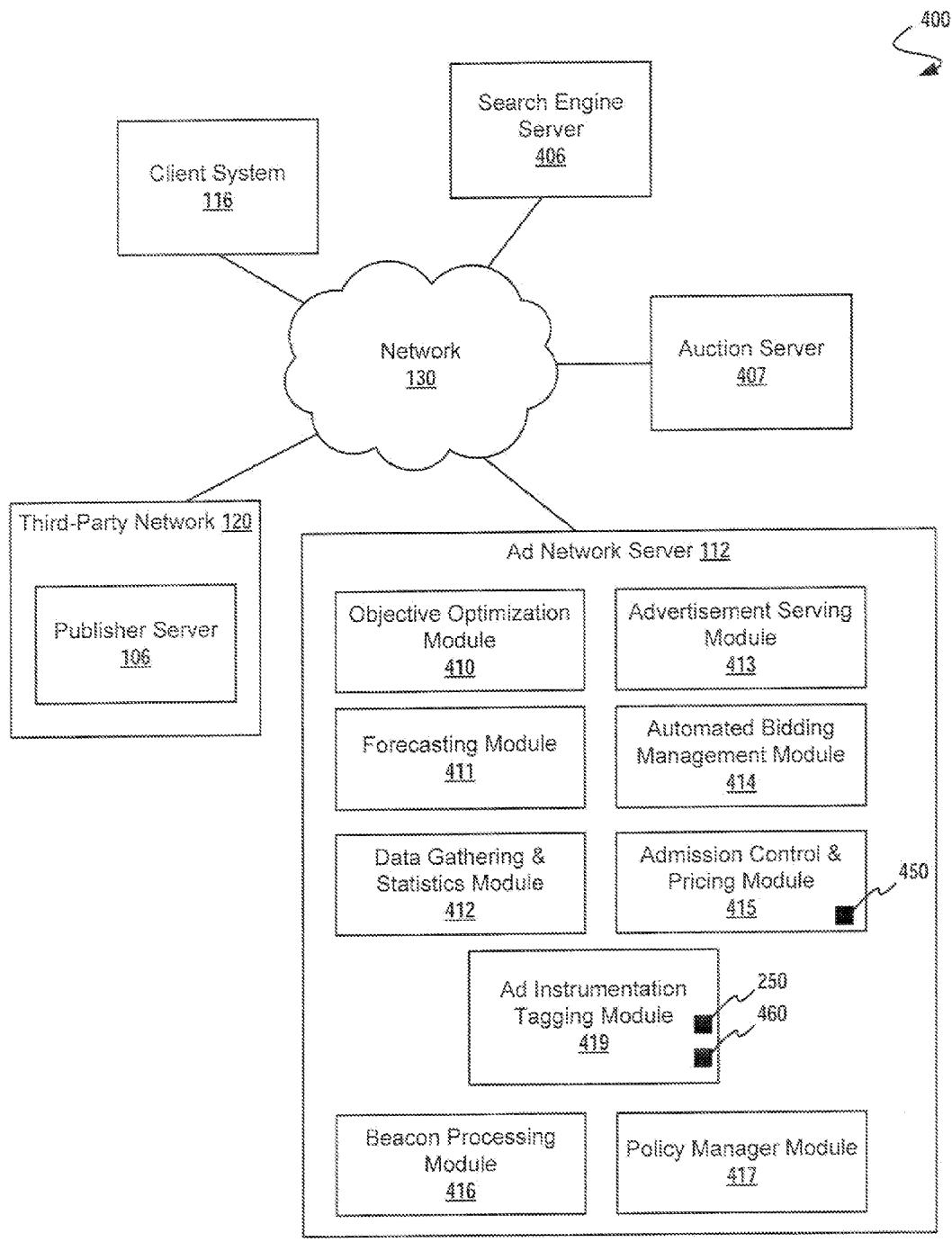
FIG. 4 depicts an advertising server network including modules for measuring inline ad performance for third-party ad serving, in which some embodiments operate.

FIG. 4 depicts an advertising server network including modules for measuring inline ad performance for third-party ad serving.

In the context of internet advertising, placement of advertisements within an internet environment (e.g. online advertising system 400 of FIG. 4) has become common. As shown, network nodes are organized into a network such than an internet advertiser or agent may select a particular property (e.g. Yahoo.com), and may create an advertisement such that whenever any internet user, via a client system 116, renders the web page from the selected property, possibly using a search engine server 406, the advertisement is composited on the web page by one or more servers (e.g. a server within a third-party network 120 and/or an ad network server 112) for delivery to a client system 116 over a network 130. Given this generalized delivery model, and using techniques disclosed herein, sophisticated online advertising might be practiced. Moreover the online advertising system 400 serves various needs of third-party participants in the internet ad ecosystem 100, including booking of contracts for internet advertising campaigns, and for management of a wide range of aspects of prosecuting such an internet advertising campaign.

Again referring to FIG. 4, an internet property (e.g. embodied in a publisher server 106) might be able to attract internet visitors, which visitors may have any arbitrary interest, demographic, target predicates, or other attributes. In fact, a publisher server 106, possibly in conjunction with a data gathering and statistics module 412, can capture details as pertains to user behavior. Thus, an internet user's behaviors, demographics and interests might be 'known' in quite some detail as pertains to a wide range of user queries, interest categories, or other demographics or attributes. Also, behaviors (e.g. the likelihood of a click or other measurable event) might be known in quite some detail, not only for a particular user, but also for a group of users corresponding to a particular slice of the available data. Such characteristics (i.e. one or more characteristics) and/or features can be used in the statistical modeling of users, even to the extent that a forecasting module 411, possibly in conjunction with a data gathering and statistics module 412 can forecast future supply accurately—or at least to a statistically known degree of accuracy. Thus, for a particular user, ads corresponding to the demographics of the particular user may be served as advertisements retrieved from an ad network server 112. In some situations, reaching a particular demographic is commercially competitive, so advertisements retrieved from an ad network server 112, possibly in conjunction with an auction server 407, may be used to resolve such a competition.

In some embodiments, the online advertising system 400 might host a variety of modules to serve management and control operations (e.g. an objective optimization module 410, a forecasting module 411, a data gathering and statistics module 412, an advertisement serving module 413, an automated bidding management module 414, an admission control and pricing module 415, etc) pertinent to booking contracts and for serving advertisements to users. In particular, the modules, network links, algorithms, assignment techniques, serving policies, and data structures embodied within the online advertising system 400 might be specialized so as to perform a particular function or group of functions reliably while observing capacity and performance requirements. For example, an admission control and pricing module 415 might serve for storing an original third-party internet ad 450 in readiness for processing before the start of a corresponding campaign. As a further example, an ad instrumentation tagging module 419, a beacon processing module 416, and/or a policy manager module 417 can operate partly in an offline (or batch) mode, and partly in a real-time (or interactive) online mode. As shown, and without regard to allocation of any particular operation to any particular mode, an ad instrumentation tagging module 419, can accept an original third-party internet ad 450 and recode it into one or more forms for producing a recoded third-party internet ad 460 using ad instrumentation code 250. Any one or more modules within an online advertising system 400 can operate cooperatively to implement a system for measuring inline ad performance for third-party ad serving.

Ad Instrumentation Tagging Module

In exemplary embodiments the following considerations are used to balance trade-offs when implementing systems for measuring inline ad performance for third-party ad serving:

1. Real Users in Real-Time—Embodiments instrument ads for measurements taken in real-time as the users view ads embedded in publisher pages. In some cases, measurements are taken in real-time for each and every user that views the instrumented ads.
2. Near Real-Time Notification—Embodiments can instrument ads for real-time measurements, and can beacon the response latency measurements to a beacon processing module 416.
3. Embodiments can capture certain HTTP round-trip latencies for any (or all) possible requests and hops that happen during the rendering of the ads (see ad request message 316, message 322, etc).
4. Embodiments support use of various adtags (e.g. iframe or JavaScript tags).
5. Embodiments support measurements in a wide range of environments (e.g. AJAX environments, etc).
6. Embodiments support measurements for various adtypes (e.g. text-only ads, simple graphic ads, rich-media ads, etc).

a module for capturing real-time measurements 520 may communicate at any point in time over bus 505.

It is recognized by those skilled in the art that an ad for internet advertising is embodied as ad code. As used herein, ad code is some mixture of native HTML code (e.g. tags, attributes, attribute values, etc), HTML SCRIPT references, and HTML references to literals. For example, the code segment (aka "blob") below uses the HTML SCRIPT tag, and refers to the scripting language known as "JavaScript1.1":

```
<SCRIPT language='JavaScript1.1'
SRC="http://ad.yieldmanager.com/st?ad_type=ad....">
</SCRIPT><img src="http://ad.yieldmanager.com/imp....">
```

Those skilled in the art will recognize that a particular desired function may be implemented in HTML in many forms. In particular, nearly any HTML blob can be recoded into a script call. For example, the two code segments in Table 1 below shows how an original code segment (see the column HTML Form 1) is recoded into a modified code segment (see the column HTML Form 2), which results in a modified code segment for performing the original code segment functions, as well as for performing functions enabled by the added instrumentation code.

TABLE 1

Recoding a script call

| HTML Form 1 | HTML Form 2 |
| --- | --- |
| <SCRIPT language='JavaScript1.1' SRC="http://ad.doubleclick.net/ adj/N2958.autos.yahoo.com/B3502 968.83;sz=300×250;dcopt=rcl;mtf IFPath=nofile;click=%rd%/%space %/*;ord=%time2%?"></SCRIPT> | <script language="JavaScript1.1" > ... third_party_adtag = '<SCR'+'IPT language=\'JavaScript1.1\' SRC="http://ad.doubleclick.net/adj/N2958.a utos.yahoo.com/B3502968.83;sz=300×250;dcop t=rcl;mtfIFPath=nofile;click=%rd%/%space%/ *;ord=%time2%?"></SCR'+'IPT>\n', ... document.write('...'); </script> |

7. Exemplary embodiments do not alter selection and/or rendering of ads, and do not adversely impact user experience.
8. Exemplary embodiments support a wide range of browsers, and the techniques can be used for any arbitrary content distribution network; and further, exemplary embodiments may be used in conjunction with any arbitrary third-party within a third-party network.

A module such as an ad instrumentation tagging module 419 can be employed to implement aspects of instrumentation tagging that implement solutions corresponding to some mixture of the above considerations.

Figure 5A:
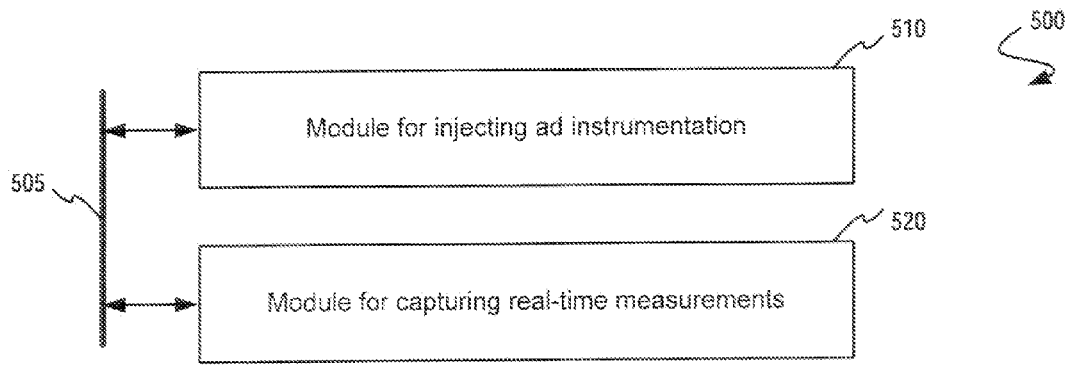
FIG. 5A depicts a system showing two phases of processing within a system for measuring inline ad performance for third-party ad serving, according to an exemplary embodiment.

FIG. 5A depicts a system showing two phases of processing within a system for measuring inline ad performance for third-party ad serving. As shown, the system 500 includes a module for injecting ad instrumentation 510, and a module for capturing real-time measurements 520. In some embodiments, the modules of this system operate in two phases, a first phase for injecting ad instrumentation, and a second phase for capturing real-time measurements. The aforementioned two phases are not strictly non-overlapping in time, and thus, a module for injecting ad instrumentation 510, and Moreover, inasmuch as display ad code may be stored as a code segment of HTML content (which is later interpreted and displayed by the browser rendering engine), the module for injecting ad instrumentation 510 serves for recoding (e.g. retagging) the ad code. More specifically, the recoding operation recodes an ad code blob of HTML content by transforming it into a JavaScript literal such that it can be emitted onto the page using a document.write( ) statement in order to make it compatible for dynamic inspection/instrumentation of its HTML tags. Such recoding can reasonably occur after contract booking, and can be performed by an ad instrumentation tagging module 419, which module may recode using ad instrumentation code 250.

The module for capturing real-time measurements 520 serves to receive messages including network latencies as are emitted (e.g. beaconed) by the recoded ad code (e.g. the ad code recorded by the module for injecting ad instrumentation 510). Such real-time measurements (e.g. network latencies) are measured at the time of rendering the ad, and thus those real-time measurements fairly represent the actual performance of the third-party network as it performs during ad rendering.

Figure 5B:
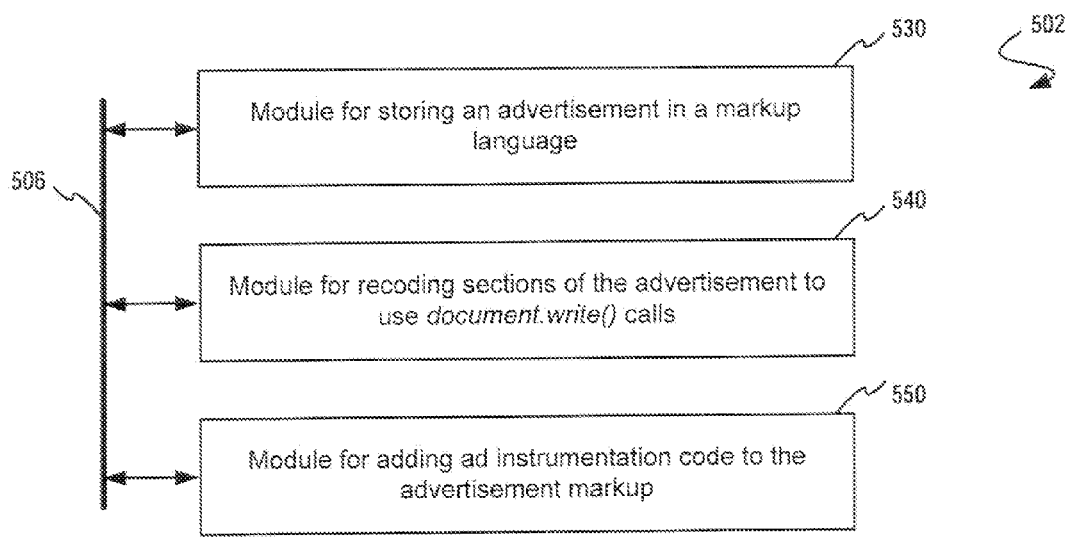
FIG. 5B depicts a system showing advertisement tagging within a system for measuring inline ad performance for third-party ad serving, according to an exemplary embodiment.

FIG. 5B depicts a system showing advertisement tagging within a system for measuring inline ad performance for third-party ad serving. As shown, the system 502 includes a module for storing an advertisement in a markup language such as XHTML or XML (see module 530), a module for recoding sections of the advertisement to use document-.write( ) calls (see module 540), and a module for adding ad instrumentation code to the advertisement markup (see module 550). The aforementioned operations are not strictly non-overlapping in time, and thus, a module 530, module 540, and module 550 may communicate at any point in time over bus 506.

More particularly, various embodiments of the system 502 can implement recoding the ad code using scripting technologies (e.g. JavaScript) to recode and/or inject code for dynamically inspecting and instrumenting ad code for capturing latencies during the rendering process of a browser engine. One method for dynamically recoding ad code is to use a document.write( ) call which accepts a literal for subsequent browser processing, which in turn emits the recoded literal onto the page for further browser processing. In some cases, one or more servers in the internet ad ecosystem 100 override the document.write( ) native DOM API, such that the overridden document.write( ) call serves to dynamically inspect injected HTML content in order to find the HTML tags that have external references. Such tags are instrumented with timers to capture the latencies. Examples of such tags that have external references include SCRIPT, IMG, IFRAME, OBJECT, and EMBED.

Figure 5C:
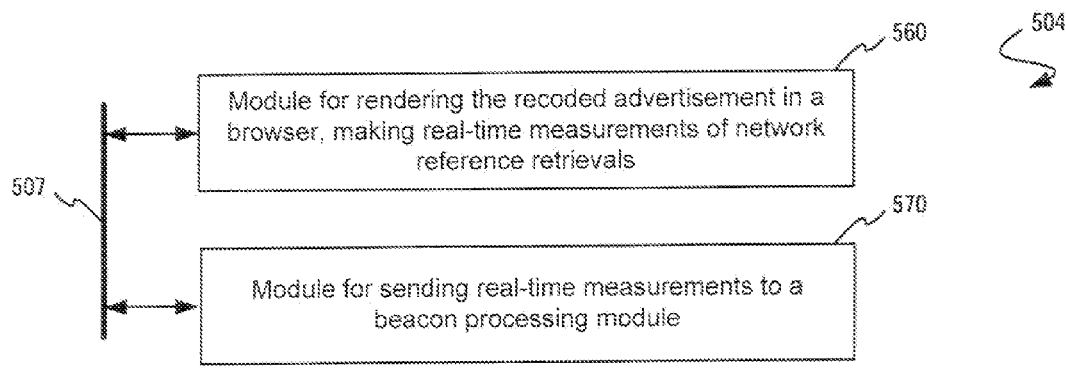
FIG. 5C depicts a system showing real-time beaconing within a system for measuring inline ad performance for third-party ad serving, according to an exemplary embodiment.

FIG. 5C depicts a system showing real-time beaconing within a system for measuring inline ad performance for third-party ad serving. As shown, the system 504 includes a module for rendering the recoded advertisement in a browser, making real-time measurements of network reference retrievals (see module 560), and a module for sending real-time measurements to a beacon processing module (see module 570). The aforementioned operations are not strictly non-overlapping in time, and thus, module 560 and module 570 may communicate at any point in time over bus 507.

In various embodiments, the system 504 operates during, or in cooperation with, the module for capturing real-time measurements (see module 520). As the instrumented ad code is rendered on the browser the native document.write( ) call is overridden to start inspecting the dynamically injected HTML code before handing off to the browser for rendering. This technique specifically checks for HTML tags that use external references (e.g. IFRAME, SCRIPT, IMG, and OBJECT/EMBED tags). Further, browser interpretation of the IFRAME and SCRIPT tags supports the capability to pull in additional HTML tags which may in turn cause additional requests. In most embodiments, browser interpretation of an IMG or OBJECT tag will terminate after they are rendered—and do not cause further requests.

As an example, consider the following ad code:

| Original third-party internet ad: |
| --- |
| <SCRIPT language='JavaScript1.1' SRC="http://ad.yieldmanager.com/st?ad_type=ad...."> </SCRIPT><img src="http://ad.yieldmanager.com/imp...."> |
| Recoded third-party internet ad: |
| <!--Start Recoded Tag--> <script language="JavaScript1.1" > third_party_adtag = '<SCR'+'IPT language=\'JavaScript1.1\' SRC="http://ad.yieldmanager.com/st?ad_type=ad....."> </SCR'+'IPT>\n<img |

| -continued |
| --- |
| src="http://ad.yieldmanager.com/imp....">', .... .... .... </script> <!--End Recoded Tag--> |

As shown, the recoding of the example instrumentation converts the adtag to a JavaScript literal which can be emitted onto the page with a document.write( ) call, enabling dynamic inspection and instrumentation of HTML code.

A slightly more complex narration (i.e. more hops) is as follows: The recoded script ad-call returns an iframe ad-call to the requesting server (e.g. following this example, the server at "ad.yieldmanager.com"), and concurrently emits a beacon to an ad aggregator's server (e.g. again a doubleclick.net ad server). Continuing this example, the doubleclick.net server returns a flash asset reference to its content distribution server that serves for hosting the asset, then the ad asset is loaded and rendered.

Indicated in Table 2 are the round-trip latencies of the http requests that take place as the adtag is rendered by the browser for a given user. The call with the longest latency is actually in the second hop, the hop to the doubleclick.net ad server, which is a client side redirect happening within the browser environment as the ad is being loaded. As the calls are being made to fetch external resources, the ad instrumentation code 250 performs an operation for making real-time measurements of network reference retrieval serves for preparing a latency data structure similar to that shown in the table.

TABLE 2

Latency waterfall table

| Object | URL | Latency | Hop | Order |
| --- | --- | --- | --- | --- |
| Script | http://ad.yieldmanager.com | 200 ms | — | 0 |
| Img | http://ad.yield..../imp... | 20 ms | 1 | 0 |
| Iframe | http://doubleclick.net/... | 2000 ms | 2 | 1 |
| Img | http://doubleclick.net/... | 40 ms | 3 | 1 |
| Embed | http://cdn.doubleclick/... | 500 ms | 4 | 2 |

Various information within the aforementioned latency data structure is beaconed across to beacon processing module 416 for processing and aggregation. The details of processing and aggregation are discussed in paragraphs farther below.

Backfill Ad

In addition to the measurements and beaconing just discussed, the ad instrumentation code 250 also provides a capability to backfill the intended ad (e.g. the recoded third-party internet ad 460) with a separately-hosted backfill ad. This capability serves in order to maintain a user-acceptable experience, and is invoked in the case that the overall ad load time (e.g. cumulative latencies after adjusting for overlapping latencies) exceeds a certain time threshold. In exemplary embodiments, the capability is configured and operates as follows:

1. A client-side timer with backfill time duration (timeout) is established before rendering of an ad begins.
2. If the ad completes loading within the allotted time, the timeout timer is simply cancelled and the intended ad (e.g. the recoded third-party internet ad 460) is displayed.

3. Alternatively, if backfill time duration (timeout) is exceeded (e.g. cumulative/adjusted latencies exceed the allotted timeout time) then the loading of the intended third-party ad content is aborted and the ad content is replaced with the backfill content.

The above operations operate dynamically, beginning at the time of the ad call. In some embodiments, the occurrence of a timeout condition (and backfill) is sent across to a beacon processing module 416 for tracking.

Inline User Feedback

The instrumentation technique discussed above is also integrated with the capability to collect inline feedback from the user. The goal here is to collect and aggregate vital user feedback as pertains to the perceived load time, and/or as pertains to the editorial quality of the displayed ad, and/or as pertains to any issues around rendering of an ad in various browsers or on various platforms or devices. The feedback experience can be presented inline within the ad or near the ad (e.g. using an interactive screen device 205) such that it is easy for users to report a possible issue without having to leave the page being viewed. The following Table 3 suggests a possible presentation of the options shown to the user to report possible issues with the ad:

TABLE 3

Possible options for users to report possible issues

| Device | Displayed Text |
|---|---|
| Checkbox | Empty Ad! No ad displayed |
| Checkbox | Ad rendered only partially |
| Checkbox | Offensive or inappropriate content |
| Checkbox | Ad load too slow |
| Checkbox | Irrelevant ad |
| Text box | <space for free-form feedback> |
| Button | Submit |
| Button | Close |

Such a screen device for inline user feedback may be implemented using css/JavaScript to dynamically render the feedback screen device, which when activated, opens an inline overlay layer on top of the ad, thus presenting the screen device for soliciting inline user feedback. As the user interacts with the screen device, the use's inline feedback is aggregated and submitted to the beacon processing module 416. In some cases a beacon processing module 416 implements a feedback aggregation plug-in, which plug-in may be updated dynamically at any point in time.

Data Collection and Aggregation

Instrumented ads emit important measurements regarding display of ads from third-party networks—namely, latency measurements and timeout occurrences and/or measurements. As earlier discussed, higher measurements tend to have a negative impact on user experience. Also, an increase in the number of occurrences of timeouts for a given ad can potentially point to an underperforming third-party network infrastructure for ads. Aggregation of these data points in near real-time can be used as an aid for immediately identifying corrective action for such ads or for identifying corrective action pertaining to underperforming third-party network infrastructure for ads.

Policies and Enforcement

As earlier described, an ad network server 112 can include a policy manager module 417, which policy manager module serves for receiving and processing aggregated data from a beacon processing module 416. In exemplary embodiments, a policy manager module 417 may maintain all the latency and timeout information on a per-ad basis and on an hourly, daily and/or weekly level.

Rules and corresponding actions are defined with respect to such data sets (e.g. no more that 20 timeouts per hour, etc) and when a rule is violated, the actions associated with the violated rule are fired. Typical use cases would be:

1. If the user experience (e.g. latency) is flagged as consistently bad, then the ad can be taken down, or;
2. If the user flags the ad as offensive, then the ad can be sent for editorial review.

More generally, consistently occurring flags over a predefined period (say over several days, or over a week) can trigger notification to the third-party ad-serving system administrator. Such notification can be automatic (e.g. via sending an email to the third-party ad serving system administrator) or it can be manual, possibly involving editorial staff personnel.

Figure 6:
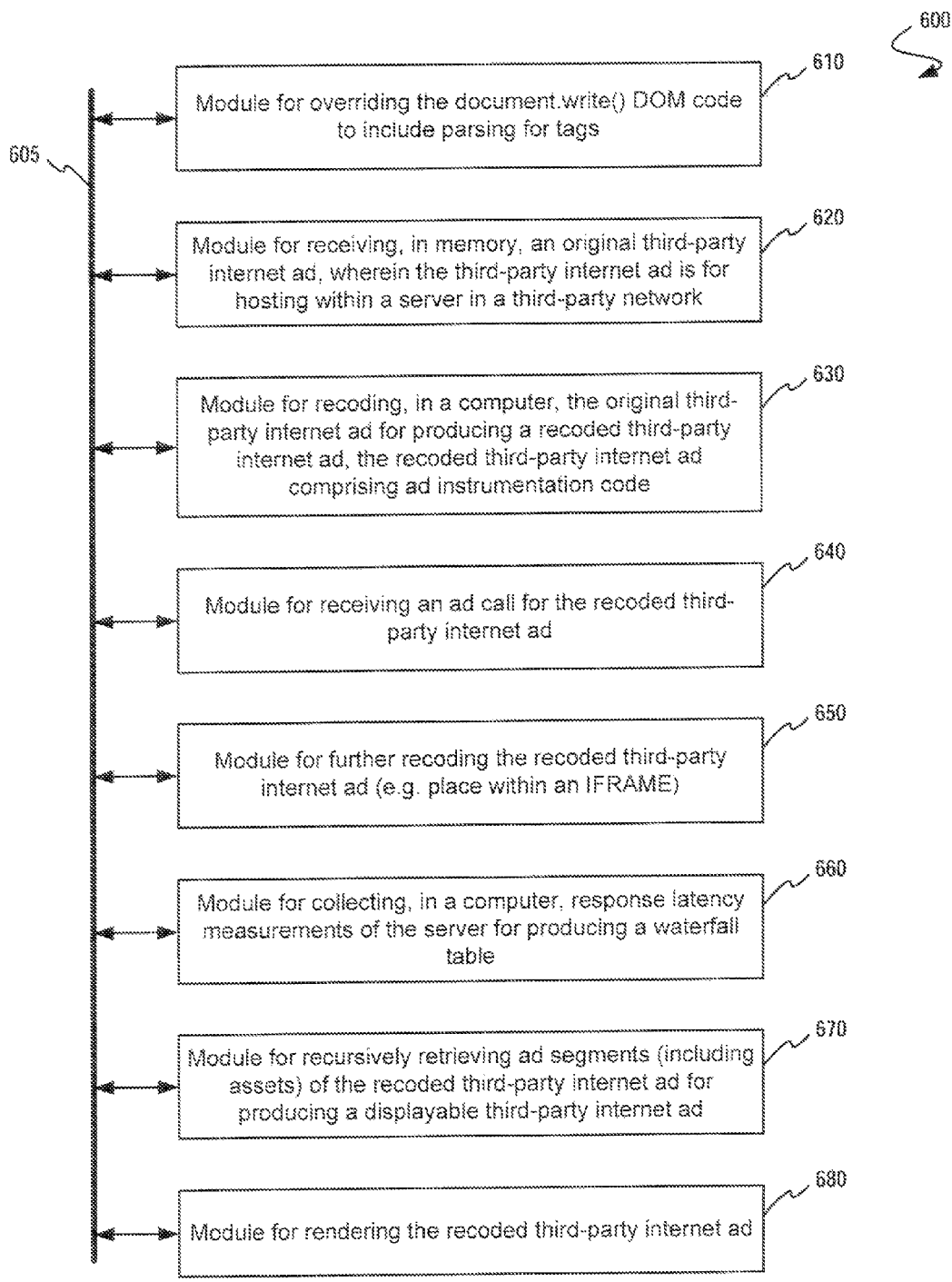
FIG. 6 depicts a system for measuring inline ad performance for third-party ad serving, according to an exemplary embodiment.

FIG. 6 depicts a system for measuring inline ad performance for third-party ad serving. As shown, the system 600 comprises a plurality of modules, and any of the operations within a module can be implemented in a computer, and any operation performed within a module can communicate with any other module over bus 605. In an exemplary embodiment, system 600 includes modules for overriding the document.write( ) DOM code to include parsing for tags (see module 610). This operation may be done well in advance of any other operations within system 600.

System 600 also includes modules for receiving in a computer (e.g. within admission control and pricing module 415) an original third-party internet ad, wherein the third-party internet ad is for hosting within a server in a third-party network (see module 620). Additionally, exemplary embodiments of system 600 may comprise modules for recoding, in a computer (e.g. ad instrumentation tagging module 419), the original third-party internet ad for producing a recoded third-party internet ad, the recoded third-party internet ad comprising ad instrumentation code (see module 630), a module for receiving an ad call (e.g. in an advertisement serving module 413) for the recoded third-party internet ad (see module 640), a module for further recoding the recoded third-party internet ad, such as placing the recoded third-party internet ad within an IFRAME (see module 650), and a module for collecting, in a computer (e.g. within beacon processing module 416), a plurality of response latency measurements for producing a waterfall table (see module 660) showing multiple response latency measurements as measured during requests to any servers within a third-party network 120.

In some cases system 600 invokes a module for recursively retrieving ad segments (including assets) of the recoded third-party internet ad for producing a displayable third-party internet ad (see module 670). The aforementioned recursion may continue to any depth so long as there are additional tags for making requests to any other servers (regardless if the server to which the request is sent is a server on a third-party network 120, or an ad network server 112, or a content distribution server 114, or any other server for that matter. Although not required under all situations, it is typical that the recoding process during recursions comprises emitting or encountering a document.write( ) call.

When all assets needed for display of the recoded third-party internet ad have been retrieved, the system 600 invokes a module for rendering the recoded third-party internet ad (see module 680).

In some embodiments the original third-party internet ad comprises ad code using a mixture of HTML language, JavaScript language, and another markup language (e.g.

XHTML), and the ad instrumentation tagging module may be configured to recode an ad code segment of HTML content by transforming the ad code segment into a JavaScript literal. Similarly, the ad instrumentation tagging module may be configured to recode an ad code segment of HTML content by transforming the ad code segment into an IFRAME (again, see module 650), or the ad instrumentation tagging module may be configured to recode an ad code segment of HTML content by transforming the ad code segment into a recoded document.write( ) call such that, at the time of rendering, the ad instrumentation code executes a recoded document.write( ) call.

Of course there are many situations that cause one or another operation to be performed before (or after) any other operation, and any number of servers may be accessed when recursively retrieving ad segments, thus it is reasonable that the aforementioned modules perform storing of a second, or third or Nth response latency measurement, the latency measurements taken in response to the performance of the accessed servers. Of course, since the number and characteristics of the measurements are determined dynamically (at the time of serving the third-party ad) it may happen that many response latency measurements are included in a latency waterfall table. In some cases, the taking of the measurements may not conclude before a timeout period and, in such a case, the measurement merely comprises measurement of a timeout value, in which case a backfill ad may be rendered in lieu of rendering the recoded third-party internet ad.

Figure 7:
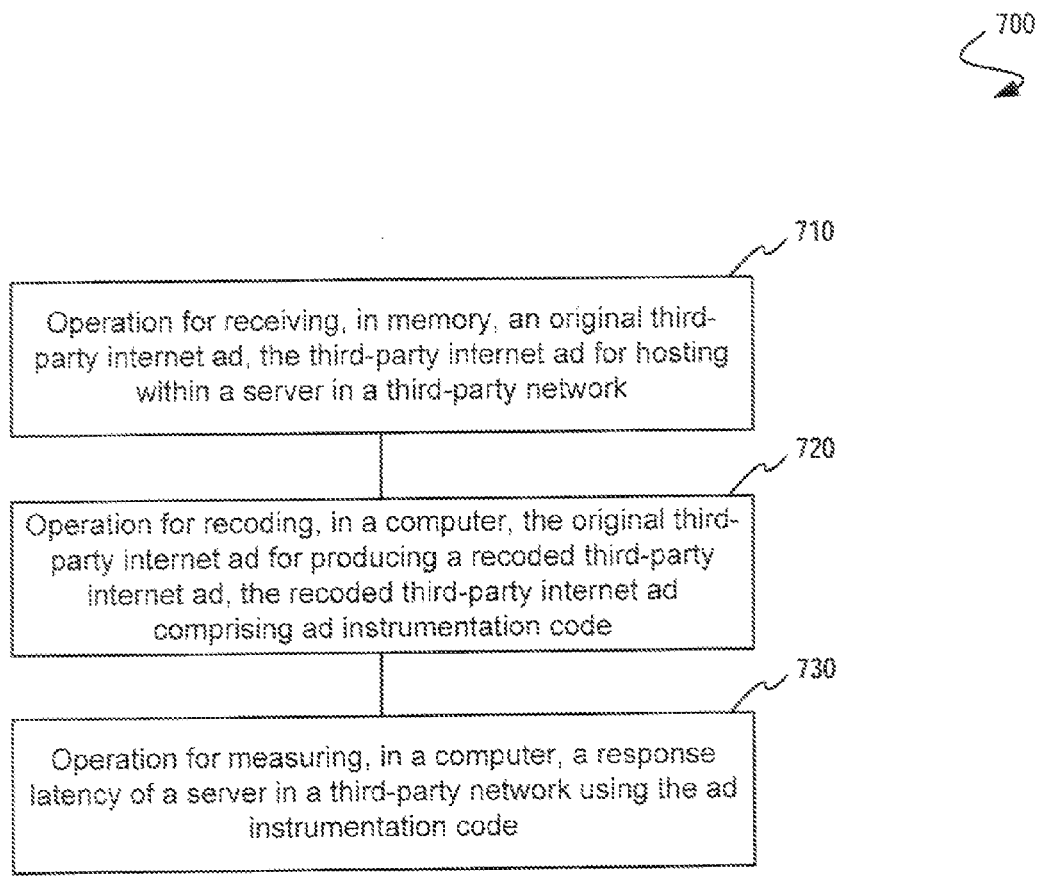
FIG. 7 depicts a block diagram of a system method for measuring inline ad performance for third-party ad serving, according to one embodiment.

FIG. 7 depicts a block diagram of a system method for measuring inline ad performance for third-party ad serving. As an option, the present method 700 may be implemented in the context of the architecture and functionality of the embodiments described herein. Of course, however, the method 700 or any operation therein may be carried out in any desired environment. The operations of the method can, individually or in combination, perform steps within method 700. Any method steps performed within method 700 may be performed in any order unless as may be specified in the claims. As shown, method 700 implements a method for measuring inline ad performance for third-party ad serving, the method 700 comprising operations for: receiving, in memory, an original third-party internet ad, the third-party internet ad for hosting within a server in a third-party network (see operation 710); recoding, in a computer, the original third-party internet ad for producing a recoded third-party internet ad, the recoded third-party internet ad comprising ad instrumentation code (see operation 720); and measuring, in a computer, a response latency of a server in a third-party network using the ad instrumentation code (see operation 730).

Figure 8:
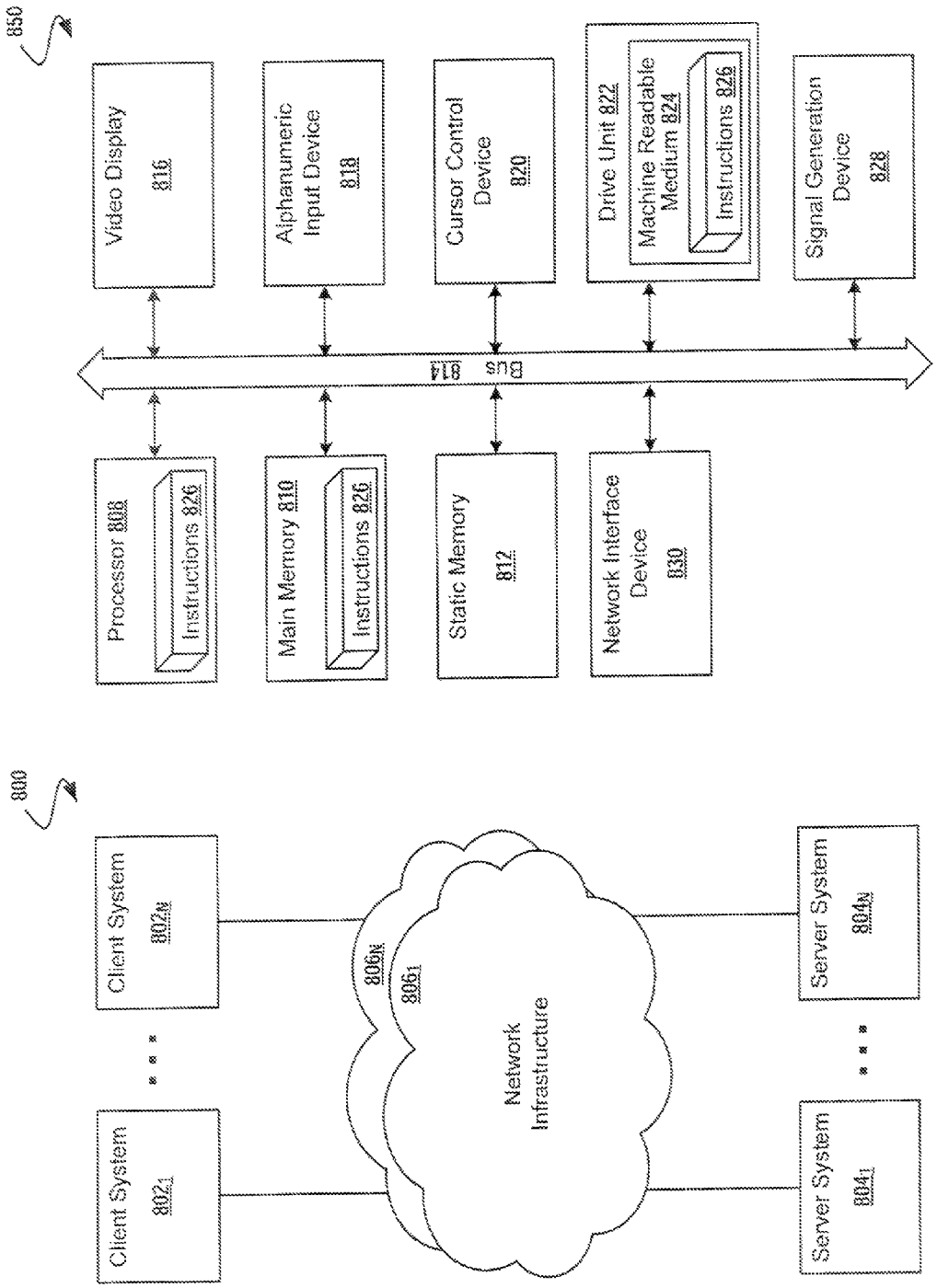
FIG. 8 depicts a diagrammatic representation of a network including nodes for client computer systems, nodes for server computer systems and nodes for network infrastructure, according to one embodiment.

FIG. 8 is a diagrammatic representation of a network 800, including nodes for client computer systems $802_1$ through $802_N$, nodes for server computer systems $804_1$ through $804_N$, and nodes for network infrastructure $806_1$ through $806_N$, any of which nodes may comprise a machine (e.g. computer 850) within which a set of instructions for causing the machine to perform any one of the techniques discussed above may be executed. The embodiment shown is purely exemplary, and might be implemented in the context of one or more of the figures herein.

Any node of the network 800 may comprise a general-purpose processor, a digital signal processor (DSP), an application specific integrated circuit (ASIC), a field programmable gate array (FPGA) or other programmable logic device, a discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g. a combination of a DSP and a microprocessor, a plurality of microprocessors, one or more microprocessors in conjunction with a DSP core, or any other such configuration, etc).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g. a client computer system, a server computer system) and/or may comprise one or more embedded computer systems, a massively parallel computer system, and/or a cloud computer system.

The computer system (e.g. computer 850) includes a processor 808 (e.g. a processor core, a microprocessor, a computing device, etc), a main memory (e.g. computer memory 810), and a static memory 812, which communicate with each other via a bus 814. The computer 850 may further include a display unit (e.g. computer display 816) that may comprise a touch-screen, or a liquid crystal display (LCD), or a light emitting diode (LED) display, or a cathode ray tube (CRT). As shown, the computer system also includes a human input/output (I/O) device 818 (e.g. a keyboard, an alphanumeric keypad, etc), a pointing device 820 (e.g. a mouse, a touch screen, etc), a drive unit 822 (e.g. a disk drive unit, a CD/DVD drive, a tangible computer readable removable media drive, an SSD storage device, etc), a signal generation device 828 (e.g. a speaker, an audio output, etc), and a network interface device 830 (e.g. an Ethernet interface, a wired network interface, a wireless network interface, a propagated signal interface, etc). The drive unit 822 includes a machine-readable medium 824 on which is stored a set of instructions (i.e. software, firmware, middleware, etc) 826 embodying any one, or all, of the methodologies described above. The set of instructions 826 is also shown to reside, completely or at least partially, within the main memory and/or within the processor 808. The set of instructions 826 may further be transmitted or received via the network interface device 830 over the network bus 814.

It is to be understood that embodiments of this invention may be used as, or to support, a set of instructions executed upon some form of processing core (such as the CPU of a computer) or otherwise implemented or realized upon or within a machine- or computer-readable medium. A machine-readable medium includes any mechanism for storing or transmitting information in a form readable by a machine (e.g. a computer). For example, a machine-readable medium includes read-only memory (ROM); random access memory (RAM); magnetic disk storage media; optical storage media; flash memory devices; and electrical, optical or acoustical or any other type of media suitable for storing information.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A computer-implemented method for measuring inline ad performance for third-party ad serving, the method comprising:
   receiving, from a publisher, a call for an original third-party internet ad;
   in response to receiving the call for an advertisement, requesting an original third-party internet ad from a third party-advertiser;
   in response to requesting an original third-party internet ad, receiving from the third-party advertiser, in memory of a computer, an original third-party internet ad embodied as ad code, the original third-party internet ad being hosted within a server in a third-party network;
   recoding, in a computer, the ad code to produce a script call containing the ad code;
   serving, by a computer, the script call to a publisher computer for compositing;
   measuring, in a computer, one or more response latencies associated with rendering the ad code; and
   replacing the ad code with a backfill ad when at least one of the one or more response latencies exceeds an allotted timeout time.

2. The method of claim 1, wherein the ad code comprises at least one of, HTML language, JavaScript language, and a markup language.

3. The method of claim 1, wherein the recoding comprises recoding the ad code t by transforming the ad code into a JavaScript literal.

4. The method of claim 1, wherein the recoding comprises recoding the ad code by transforming the ad code into an IFRAME tag.

5. The method of claim 1, wherein the recoding comprises inserting document.write( ) call to emit the ad code onto a rendered page.

6. The method of claim 1, wherein the script call executes a document.write( ) call.

7. The method of claim 1, further comprising storing, in a computer, a second response latency measurement, the second response latency measurement taken in response to a second latency of a second server.

8. The method of claim 7, wherein the second response latency is included in a latency waterfall table.

9. The method of claim 7, wherein the second response latency measurement is taken in response to a recursive call.

10. The method of claim 1, further comprising aggregating, in a computer, a plurality of the response latency measurements.

11. A non-transitory computer readable medium comprising a set of instructions which, when executed by a computer, cause the computer to perform measurements of inline ad performance for third-party ad serving, said instructions for:
   receiving, from a publisher, a call for an advertisement;
   in response to receiving the call for an advertisement, requesting an original third-party internet ad from a third party-advertiser;
   in response to requesting the original third-party internet ad, receiving from the third-party advertiser, in memory of a computer, the original third-party internet ad embodied as ad code, the original third-party internet ad being hosted within a server in a third-party network;
   recoding, in a computer, the ad code to produce a script call containing the ad code;
   serving, by a computer, the script call to a publisher computer for compositing;
   measuring, in a computer, one or more response latencies associated with rendering the ad code; and
   replacing the ad code with a backfill ad when at least one of the one or more response latencies exceeds an allotted timeout time.

12. The computer readable medium of claim 11, wherein the ad code comprises at least one of, HTML language, JavaScript language, and a markup language.

13. The computer readable medium of claim 11, wherein the recoding comprises recoding the ad code segment by transforming the ad code into a JavaScript literal.

14. The computer readable medium of claim 11, wherein the recoding comprises recoding the ad code by transforming the ad code into an IFRAME tag.

15. The computer readable medium of claim 11, wherein the script call executes a document.write( ) call.

16. The computer readable medium of claim 11, further comprising instructions for storing, in a computer, a second response latency measurement, the second response latency measurement taken in response to a second latency of a second server.

17. The computer readable medium of claim 16, wherein the second response latency measurement is taken in response to a recursive call.

18. An advertising server network for measuring inline ad performance for third-party ad serving, comprising:
   a processor configured to receive, from a publisher, a call for an original third-party internet ad;
   a processor configured to, in response to receiving the call for an original third-party internet ad, request an original third-party internet ad embodied as ad code from a third party-advertiser;
   a processor configured to receive, in response to the request for an original third-party internet ad, in memory, an original third-party internet ad from a third-party, the third-party internet ad being hosted by a server in a third-party network;
   a processor configured to recode the ad code to produce a script call containing the ad code;
   a processor configured to serve the script call to a publisher computer for compositing;
   a processor configured to measure one or more response latencies associated with rendering the ad code; and
   a processor configured to replace the ad code with a backfill ad when at least one of the one or more response latencies exceeds an allotted timeout time.

19. The computer readable medium of claim 17, further comprising instructions for aggregating, in a computer, the one or more response latencies and the second response latency measurement.

20. The computer readable medium of claim 17, wherein the second response latency measurement exceeds a second timeout time.

21. The computer readable medium of claim 19, further comprising instructions for rendering a backfill ad in response to the second response latency measurement.

22. The advertising server network of claim 18, wherein the ad code comprises at least one of, HTML language, JavaScript language, a markup language.

23. The advertising server network of claim 18, wherein the recoding comprises recoding the ad code by transforming the ad code into a JavaScript literal.

24. The advertising server network of claim 18, wherein the recoding comprises recoding the ad code by transforming the ad code into an IFRAME tag.

25. The advertising server network of claim 18, wherein the recoding comprises inserting a document.write( ) call to emit the ad code onto a rendered page.

26. The advertising server network of claim 18, wherein the script code executes a document.write( ) call.

27. The advertising server network of claim 18, further comprising a module processor to store a second response latency measurement.

28. The advertising server network of claim 27, wherein the second response latency measurement and the one or more response latencies of the server in the third-party network are included in a latency waterfall table.

29. The advertising server network of claim 27, wherein the second response latency measurement is taken in response to a recursive call.

30. The advertising server network of claim 18, further comprising a processor to aggregate a plurality of response latency measurements.

31. The advertising server network of claim 18, wherein measuring a response latency comprises measuring a timeout time.

\* \* \* \* \*